United States Patent [19]

Schruff et al.

[11] 3,821,047

[45] June 28, 1974

[54] METHOD OF SOLVENT SEALING PLASTIC FILM CASSETTE SEAMS

[75] Inventors: Horst Schruff, Mulheim-Ruhr; Helmut Lehmann; Jakob Siefen, both of Leverkusen; Hermann Mathner, Koln; Willi Adams, Leverkusen; Günter Weib, Koln, all of Germany

[73] Assignee: Agfa-Gevaert Aktiegesellschaft, Leverkusen, Germany

[22] Filed: Aug. 16, 1972

[21] Appl. No.: 280,981

Related U.S. Application Data

[62] Division of Ser. No. 108,524, Jan. 21, 1971, Pat. No. 3,700,531.

[30] Foreign Application Priority Data

Feb. 21, 1970 Germany............................. 2008103

[52] U.S. Cl................ 156/69, 117/104 R, 118/315, 118/319, 118/326, 156/305, 156/575, 156/578
[51] Int. Cl. .......................... C09j 5/00, B32b 31/22
[58] Field of Search...... 117/104 R, 105.3; 118/313, 118/315, 316, 319, 326; 156/69, 305, 307, 308, 575, 578

[56] References Cited

UNITED STATES PATENTS

| 2,343,975 | 3/1944 | Hosfield.......................... 156/305 X |
| 3,259,030 | 7/1966 | Crathern et al......................... 93/49 |
| 3,301,731 | 1/1967 | Ruskin et al........................ 156/293 |
| 3,420,725 | 1/1969 | Curry................................ 156/305 |
| 3,479,986 | 11/1969 | Hoover................................... 118/2 |
| 3,615,994 | 10/1971 | MacLaine et al................... 156/159 |
| 3,765,951 | 10/1973 | Hahn .............................. 156/69 X |

*Primary Examiner*—Charles E. Van Horn
*Assistant Examiner*—Robert A. Dawson
*Attorney, Agent, or Firm*—Connolly and Hutz

[57] ABSTRACT

A synthetic plastics film cassette which consists of a cassette body covered by a U-shaped cassette cover is closed by spraying a solvent between the cover and body of the cassette. The spraying arrangement consists of several measuring cylinders and pistons, with which certain positions on the cassettes are sprayed with solvents through thin tubes.

4 Claims, 9 Drawing Figures

PATENTED JUN 28 1974  3,821,047

METHOD OF SOLVENT SEALING PLASTIC FILM CASSETTE SEAMS

This is a division of application Ser. No. 108,524, filed Jan. 21, 1971, and now U.S. Pat. No. 3,700,531.

The invention relates to a method of closing film cassettes made of synthetic plastics, the cassettes consisting of a body which is covered with a U-shaped cassette cover.

The method according to the invention consists of a feed or conveyor device and a closing device. By means of the conveyor device, the loaded film cassettes are transported in a defined position to the closing device.

It is known to weld synthetic plastics with ultrasonic vibrations. However, ultrasonic welding has been found in use to be unsatisfactory for closing film cassettes, since the cassettes have to be broken open for removing the exposed film. It was found that on breaking open cassettes whose connecting surfaces are welded ultrasonically, the cassettes do not tear as desired along the connecting seam, but in a completely undefined manner.

Furthermore there is the danger with ultrasonic welding of other parts which are in the cassette becoming united in an undesired manner with the cassette body or cassette cover. The connecting seam thus constitutes in these cases a very inefficient preferential breaking zone.

The object of the invention is to develop a method by which the aforementioned disadvantages are avoided. In addition, the method is to be economical and capable of continuous use. This object is achieved according to the invention by the cassette cover and cassette body being cemented or bonded to one another by measured spraying of a solvent.

As regards the apparatus for performing the invention for closing the film cassettes, the closing apparatus is composed of the following parts:

a. a receiving device for orientating the cassette during the closing operation;
b. a spraying device consisting of several measuring cylinders and pistons, by means of which certain areas of the cassette are each sprayed with solvents through small-calibre tubes;
c. a refilling device for refilling the measuring cylinders; and
d. a central drive means for the measuring pistons, whose direction of movement is reversible.

According to an alternative construction, instead of using several measuring cylinders and pistons, only one double measuring piston is used, with which certain areas of the cassette are sprayed with solvent from a central position through several small-calibre tubes arranged in spider-fashion.

The quantity of sprayed solvent can be varied by altering the measuring stroke or by variation of pressure.

According to one embodiment of the invention, cassettes loaded with film are transferred in orientated position via a stacking magazine to a pocketed rotating plate which advances step-by-step and which transports the cassettes to the region of the spraying station. At this station, each cassette is moved by a gripper device into the receiver of the spraying station, where the spraying operation is initiated by a contact. After this spraying operation has ended, the gripper moves the cassette back into the step-wise advancing plate, where it can be dried during the further transport thereof or further treated in any other way which may be necessary.

The invention is hereinafter described with reference to drawings, wherein.

Figure 1:
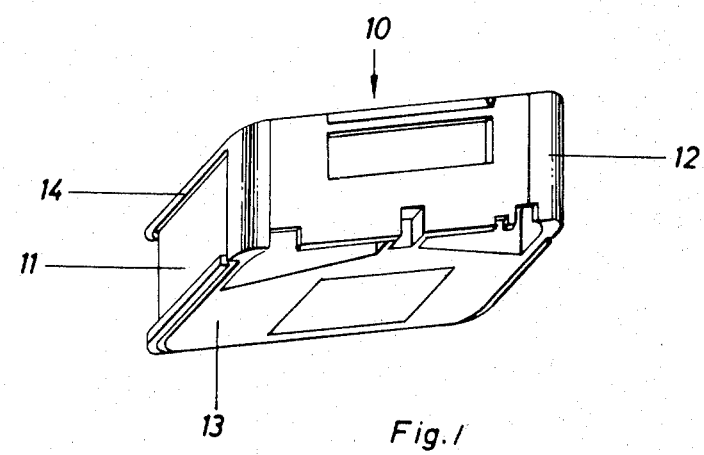
FIG. 1 is a perspective view of a cassette which is to be closed with the arrangement according to the invention.
Figure 2:
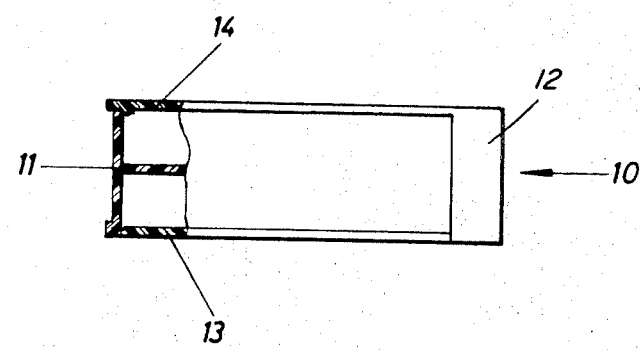
FIG. 2 is a front elevational view partially broken away of the cassette shown in FIG. 1.

FIG. 1 shows a cassette 10 which is to be closed by means of the arrangement according to the invention, the cassette consisting of a cassette body 11 and a U-shaped cassette cover 12, with arms 13 and 14, which are connected to the body by solvent sprayed thereon. As can be seen from FIG. 2, the arm 13 lies concealed or flush inside an encircling marginal recess of the cassette body 11, while the arm 14 overlaps the body.

Figure 3:
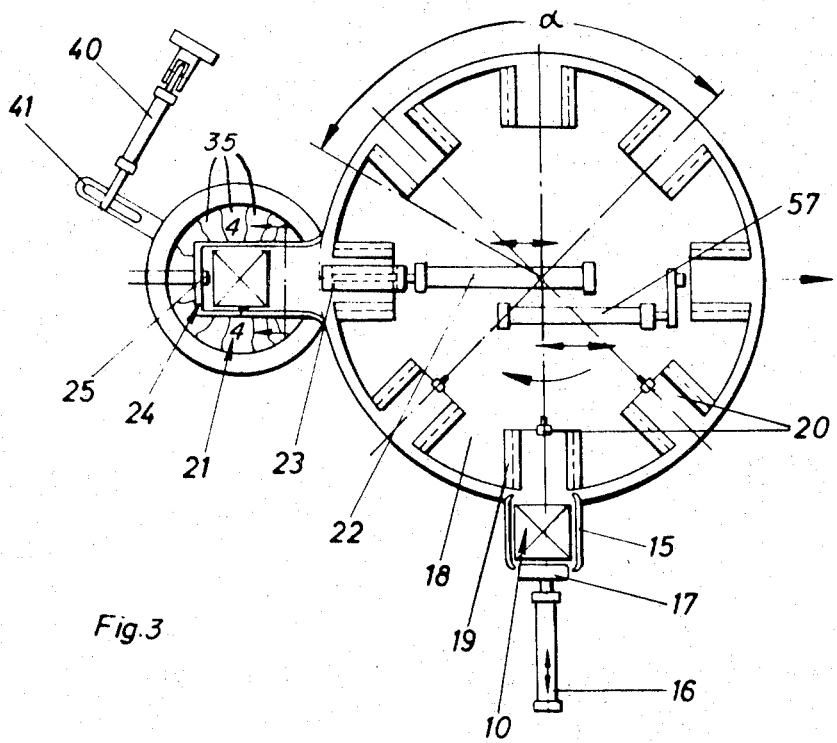
FIG. 3 is a simplified plan view of one constructional example of a closing apparatus of this invention.

FIG. 3 shows a simplified plan view of one constructional example of a closing arrangement. The cassettes 10 loaded with film are orientated in a stack in a magazine 15. A contact (not shown) is closed by the lowest of the cassettes 10, and this causes a shaped pushing part 17 of a thrust piston 16 to push the cassette 10 into a receiver 19 fixed on a pocketed rotating plate or disc 18 which advances step-by-step. A control pulse is initiated by means of a feeler device 20 actuated by the cassette, and this pulse causes the disc 18 to move forward in the clockwise direction.

Arranged in the region of the spraying station 21 is another piston 22 having a U-shaped pushing part 23, the purpose of which is to push the cassette into a receiver 24 of the spraying station 21, to hold it in this station until the spraying operation is completed and to move the cassette back again into the receiver 19 of the plate or disc 18.

The spraying operation is initiated by a contact or feeler 25 which is arranged in the receiver 24 and which is operated by the cassette 10.

Figure 5:
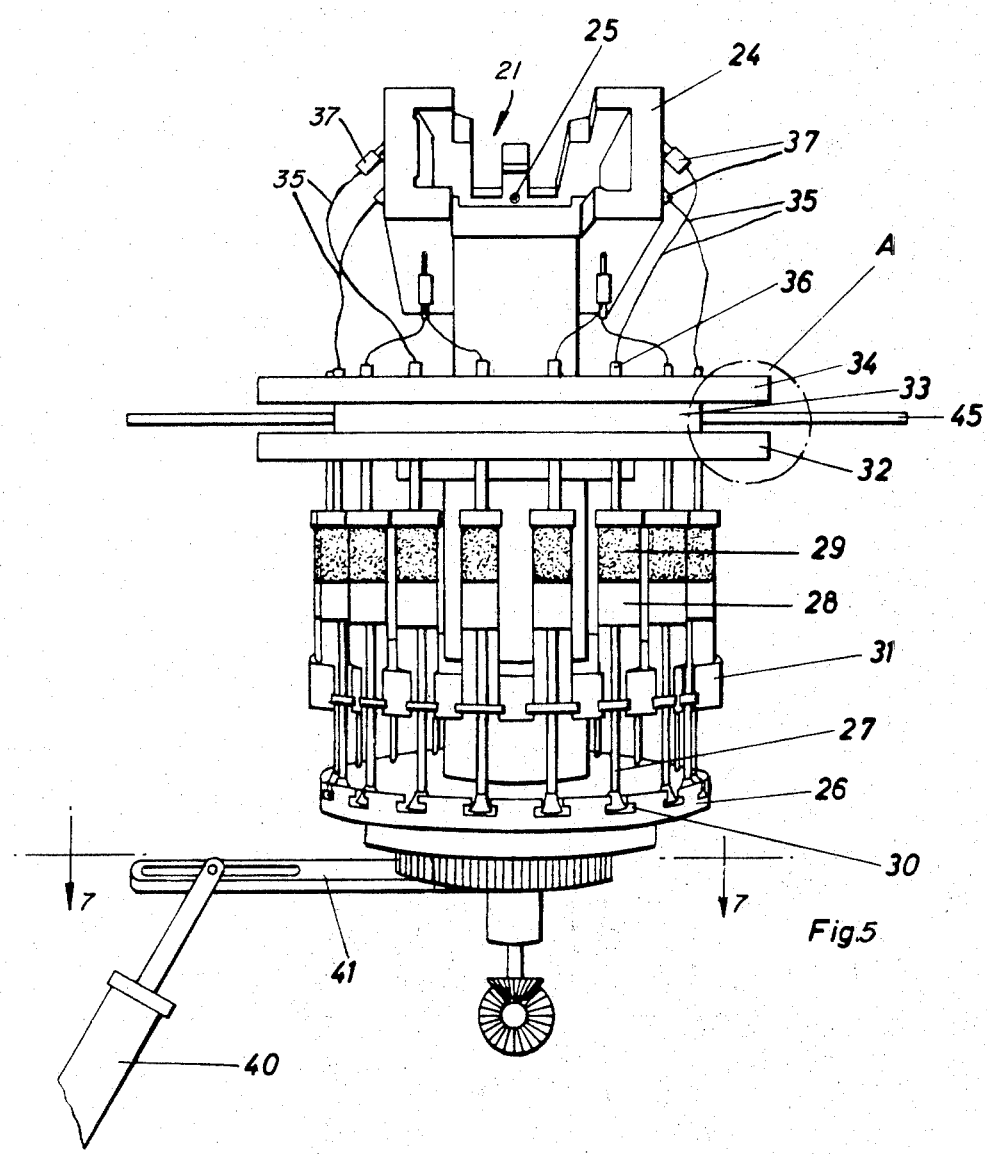
FIG. 5 is a perspective view of the spraying device.

FIG. 5 shows in perspective one constructional example of a spraying station 21. Several piston rods 27 are held in dovetail recesses 30 on the circumference of a flange 26 connected to a central lifting drive means (not shown). Pistons 28 of the piston rods 27 are guided in cylinders 29. The cylinders 29 are filled with solvents and are fixed between immovable flanges 31 and 32. Bores are arranged in alignment in the flange 32, in a flange-shaped packing 33 situated thereabove and in the flange 34 as concentric extensions of the outlet openings of the cylinders 29. The purpose of the packing 33 and of the flanges 32 and 34 is explained below.

The continuation of the solvent supply line is preferably by means of small-calibre tubes 35, which are fixed by adapters 36 on the flange 34 and by plug connections 37 on the receiver 24.

This adjusts the angular displacement of ratchet wheel 43, thereby controlling the vertical movement of the pistons to accurately meter the solvent being dispensed.

Figure 4:
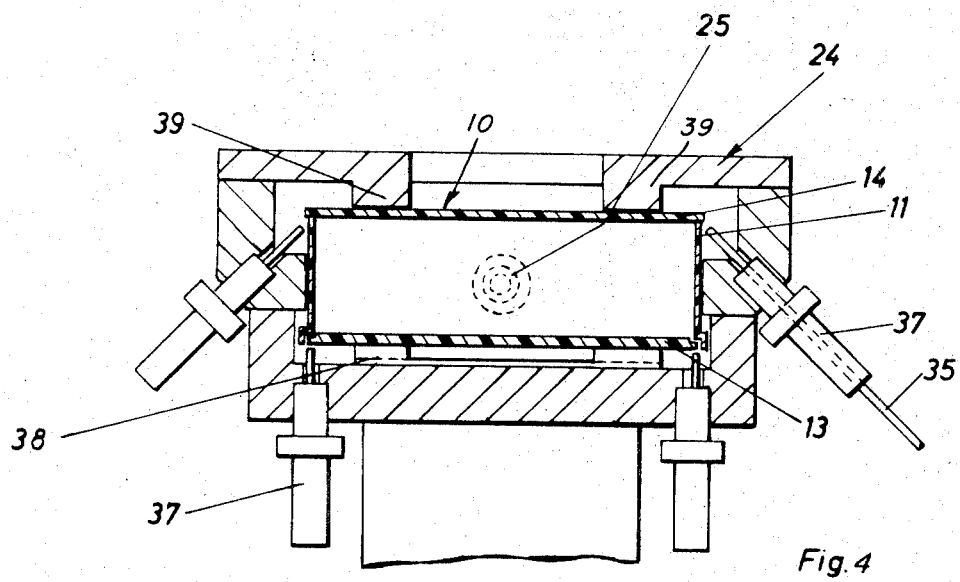
FIG. 4 is a crosssectional view in elevation taken along lines 4—4 through FIG. 3.

The plug connections 37 with the small tubes 35 displaceable therein are so arranged on the receiver 24 that the predetermined parts of the cassette 10 are sprayed by the solvent. FIG. 4 shows that the position of the cassette 10 in the receiver 24 is so chosen that the solvent is sprayed from beneath on to the cassette and consequently is unable to run inside the cassette and possibly cause the film disposed therein to stick to the cassette. There is also no danger of dripping from the small tube on to the cassette. Any excess solvent which may for any reason be sprayed on to the cassette 10 will drain off. In the spraying operation, the cassette 10 in the receiver 24 is pressed by a shaped spring 38 against the guide bars 39, so that the arms 13 and 14 of the U-shaped cassette cover 12 bear tightly against the encircling rim and the encircling marginal recess, respectively, of the cassette body 11.

The supply of solvent is measured, as shown in FIG. 5, by means of a piston 40, which is operated by the cassette 10 through the feeler or contact 25. The travel stroke of the piston 40 causes counter-clock-wise rotation of a ratchet wheel 43 via a pivotally mounted lever 41 with a locking pawl 42 mounted thereon (see FIG. 7). This in turn causes an axial movement of the central driving component (not shown) with a resultant vertical movement of the flange 26 connected thereto. As a consequence, the piston rods 27 supported on the flange 26 are moved with the pistons 28 into the cylinders 29 and force the solvent through the tubes 35 on to predetermined positions on the cassette 10.

The quantity of sprayed solvent can be varied by altering the measuring travel stroke which is covered by the piston 28. By moving the pivot point 44 by which the piston 40 and the lever 41 are connected, the travel of the lever 41 and thus also the angle of engagement of the pawl 42 with the ratchet wheel 43 is moved, being made shorter or longer. This adjusts the angular displacement of ratchet wheel 43, thereby controlling the vertical movement of the pistons to accurately meter the solvent being dispensed.

Figure 6A:
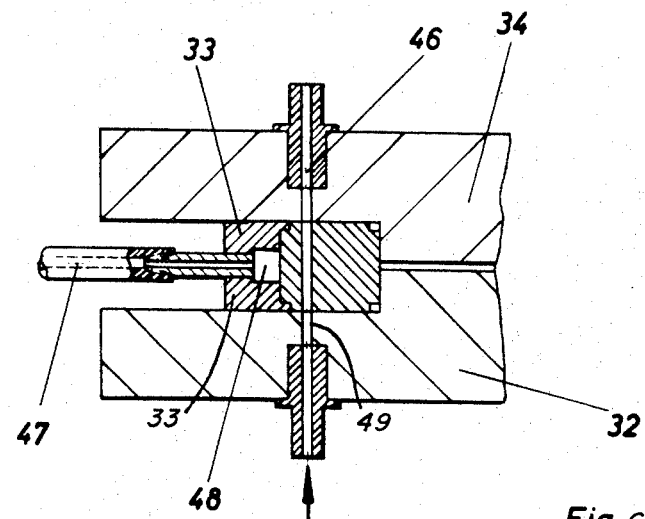
FIG. 6a is an enlarged cross-sectional view of the circled area A of FIG. 5 in the dispensing position.
Figure 6B:
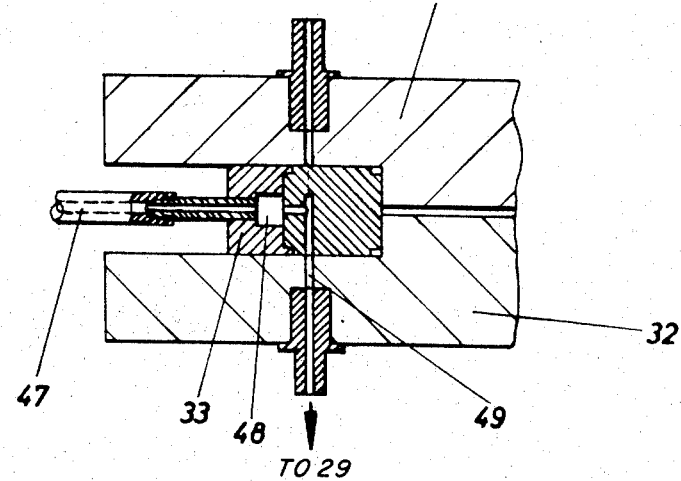
FIG. 6b is an enlarged cross-sectional view of the circled area A of FIG. 5 in the filling position.
Figure 7:
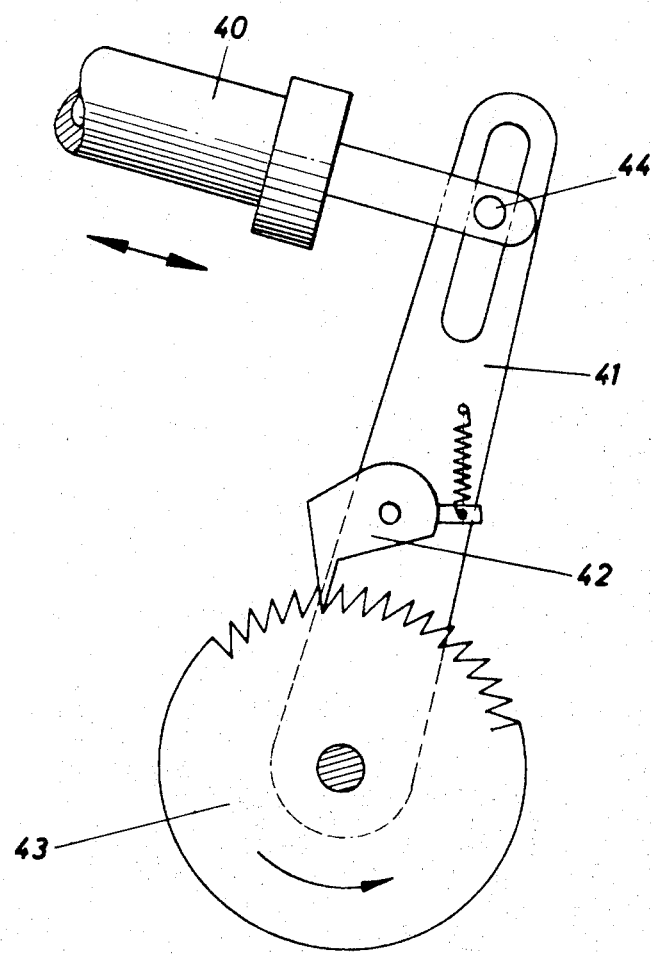
FIG. 7 is a sectional plan view taken through FIG. 5 along the line 7—7.

To refill the cylinders 29 with solvent, the packing 33 (FIG. 5) is adjusted by means of handles 45 arranged thereon and by a few degrees up to an abutment which is not shown. As a result, the bores 46 which are to be seen in FIG. 6a and which extend in alignment through the flanges 32 and 34 and also through the packing 33, (the bores being the concentric continuation of the outlet openings of the cylinders 29) are interrupted and the arrangement shown in FIG. 6b is produced. The solvent liquid can flow from a storage reservoir (not shown) through a flexible connection 47 into an annular groove 48 and is drawn by suction into the cylinder through the bores 49 which are in the packing ring 33 and in the flange 32, by the withdrawal of the piston rod 27 with the piston 28. The movement of the piston 28 connected to the flange 26 (FIG. 5) can be effected by means of a manually driven gear (not shown) after disengagement of the pawl 42 (FIG. 7).

With the spraying arrangement previously described, it can be assumed that the places on the cassette 10 which are to be wetted with solvents are uniformly sprayed because of the measuring cylinder and piston provided for each position.

Figure 8:
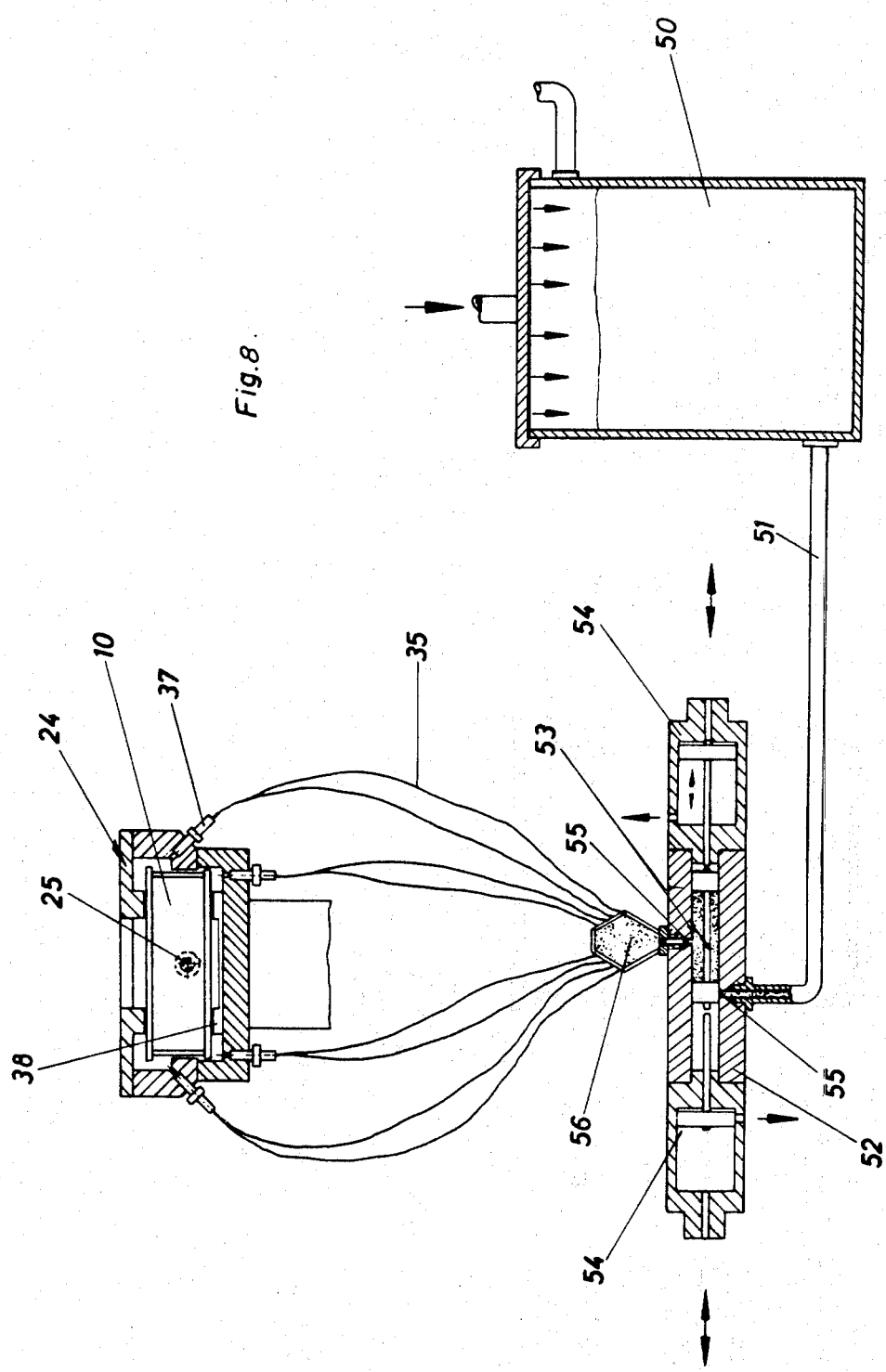
FIG. 8 is a schematic cross-sectional view in elevation of a modified form of the spraying device shown in FIG. 5.

If a slight deviation, well within the tolerance limit, in the uniformity and quantity of the solvent liquid to be sprayed on to the cassette 10 is accepted, it is possible as an alternative to provide only one double measuring piston, as shown in FIG. 8, instead of the many individual measuring cylinders and pistons.

Solvent liquid contained in an air-tight storage reservoir 50 is acted upon by a constant air pressure. The solvent is supplied to the double measuring piston 52 through a pipe 51. A piston 53 provided with packing rings is moved axially in the piston 52 through single-action cylinders 54 which are each operated by the cassette 10 to be sprayed through a contact (not shown) and through valves.

Bores 55 are formed in the cylindrical portion of the double measuring piston 52 in an offset position, and the solvent is forced through the bores 55 into the connection piece 56 during the time in which the piston 53 is moved and frees both bores 55. A number of small-calibre tubes 35, fixed to the connection piece 56 lead to the cassette receiver 24 in the same way as with the spraying station 21 previously described and are required for the passage of the solvent. The quantity of sprayed solvent can be varied by altering the liquid pressure and by altering the speed of the piston 53.

Both constructional forms of the spraying devices can be used for sealing film cassettes in the arrangement shown in FIG. 3. With this arrangement as shown, the sprayed cassette 10 can dry in the range of the angle $\alpha$ and can also be further treated as may be necessary. The cassette is ejected or supplied to another device or machine by means of a piston 57.

We claim:

1. A method of sealing the seams of a film cassette having a synthetic plastic body and cover comprising the steps of spraying measured amounts of a solvent for said synthetic plastic upwardly relative to said synthetic plastic body into predetermined portions of said seams whereby said solvent runs along said seams and seals them and is prevented from running inside the cassette.

2. A method as set forth in claim 1 wherein said measured amounts of solvent are sprayed at a predetermined station of the cassettes and said cassettes are successively conveyed to said stations to spray said measured amounts of solvent into said predetermined portions of said seams at said stations.

3. A method as set forth in claim 2 wherein said cassettes are clamped firmly in position while their seams are being sprayed at said stations.

4. A method as set forth in claim 2 wherein said spraying at said stations is performed substantially simultaneously.

* * * * *